US007914932B2

(12) United States Patent
Yoshida et al.

(10) Patent No.: US 7,914,932 B2
(45) **Date of Patent: *Mar. 29, 2011**

(54) ALL-SOLID-STATE BATTERY

(75) Inventors: Toshihiro Yoshida, Nagoya (JP); Hiroyuki Katsukawa, Niwa-Gun (JP); Shigeto Okada, Fukuoka (JP)

(73) Assignees: NGK Insulators, Ltd., Nagoya (JP); Kyushu University, Fukuoka (JP)

( * ) Notice: Subject to any disclaimer, the term of this patent is extended or adjusted under 35 U.S.C. 154(b) by 1070 days.

This patent is subject to a terminal disclaimer.

(21) Appl. No.: 11/678,157

(22) Filed: Feb. 23, 2007

(65) Prior Publication Data

US 2007/0202414 A1 Aug. 30, 2007

(30) Foreign Application Priority Data

Feb. 24, 2006 (JP) ................................ 2006-048940

(51) Int. Cl.
*H01M 6/04* (2006.01)
*H01M 6/18* (2006.01)
*H01M 4/58* (2006.01)

(52) U.S. Cl. ..................... 429/304; 429/203; 429/218.1; 429/231.95; 429/322

(58) Field of Classification Search ............... 429/218.1, 429/231.6, 231.9, 231.95, 232, 203, 304, 429/322

See application file for complete search history.

(56) References Cited

U.S. PATENT DOCUMENTS

| | | | | |
|---|---|---|---|---|
| 5,910,382 | A * | 6/1999 | Goodenough et al. | 429/218.1 |
| 2007/0042265 | A1 * | 2/2007 | Tamai et al. | 429/162 |

FOREIGN PATENT DOCUMENTS

| | | |
|---|---|---|
| EP | 1 195 835 | 4/2002 |
| EP | 1 501 137 | 1/2005 |
| JP | 05-205741 | 8/1993 |
| JP | 2000-311710 | 11/2000 |
| WO | 98/12761 | 3/1998 |

OTHER PUBLICATIONS

Begam, K.M et al., "A new NASICON-type polyanion, $Li_xNi_2(MoO_4)_3$ as 3-V class positive electrode material for rechargeable lithium batteries," Solid State Ionics, Aug. 31, 2004, vol. 172, Nos. 1-4, pp. 47-52.

* cited by examiner

*Primary Examiner* — Patrick Ryan
*Assistant Examiner* — Julian Mercado
(74) *Attorney, Agent, or Firm* — Burr & Brown

(57) ABSTRACT

An all-solid-state battery having a high output power and a long life, exhibiting high safety, and being produced at a low cost is provided. The all-solid-state battery has a cathode comprising a cathode material, an anode comprising an anode material, and a solid electrolyte layer comprising a solid electrolyte, wherein the cathode material, the anode material, and the solid electrolyte are a compound shown by the following formulas (1), (2), and (3), respectively:

$$M_aN^1_bX^1_c \quad (1)$$

$$M_dN^2_eX^2_f \quad (2)$$

$$M_gN^3_hX^3_i \quad (3)$$

wherein M represents H, Li, Na, Mg, Al, K, or Ca and $X^1$, $X^2$, and $X^3$ are polyanions, each of $N^1$ and $N^2$ is at least one atom selected from the group consisting of transition metals, Al, and Cu, and $N^3$ is at least one atom selected from the group consisting of Ti, Ge, Hf, Zr, Al, Cr, Ga, Fe, Sc, and In.

9 Claims, 1 Drawing Sheet

ALL-SOLID-STATE BATTERY

DESCRIPTION OF BACKGROUND ART

1. Field of Technology

The present invention relates to an all-solid-state battery having a high output power and a long life, exhibiting high safety, and being produced at a low cost.

2. Description of Related Art

In recent years, demand for batteries has significantly expanded along with development of portable equipment such as a personal computer, cellular phone, and the like. As the medium used in order to move ions in the batteries in these applications, liquid electrolytes (electrolytic solutions) such as an organic solvent have conventionally been used. Batteries in which such an electrolytic solution is used may have a risk of leakage of electrolytic solution and the like.

In order to solve such a problem, development of an all-solid-state battery in which a solid electrolyte is used instead of a liquid electrolyte and all other components are formed from solid materials has been undertaken. Such an all-solid-state battery not only has no risk of liquid leakage due to the use of a solid electrolyte, but also is free of problems such as deterioration of battery performance caused by corrosion and the like. In particular, an all-solid lithium secondary battery is a popular target of development among researches in various fields as a secondary battery of which the energy density can be easily increased.

As a related prior art, a lithium secondary battery in which a conductive lithium ion electrolyte such as $Li_2S$—$SiS_2$—$Li_3PO_4$, etc. is used as a solid electrolyte has been disclosed (e.g. JP-A-5-205741).

However, the all-solid-state battery using a solid electrolyte as the electrolyte can output less energy than batteries using a liquid electrolyte. It has been difficult to draw a large current from the all-solid-state battery. Other problems with the all-solid-state battery are poor rate characteristics and cycle characteristics during charging and discharging and a short battery life as compared with batteries using a liquid electrolyte.

In order to solve these problems, a solid electrolyte battery in which the same inorganic oxide material as the solid electrolyte is interposed between electrode active material particles to increase the electric current that can be drawn and to improve charge-and-discharge cycle characteristics has been disclosed (e.g. JP-A-2000-311710).

However, the solid electrolyte battery disclosed in JP-A-2000-311710 has still to be improved in the output characteristics and charge-and-discharge cycle characteristics. Therefore, development of an all-solid-state battery exhibiting a higher output and having a longer life is demanded from the industrial world.

The present invention has been achieved in view of these problems in prior art and has an object of providing an all-solid-state battery having a high output power and a long life, exhibiting high safety, and being produced at a low cost.

As a result of extensive studies to attain the above object, the inventors of the present invention have discovered that the cause of difficulty in increasing delivery of a large current and improving charge-and-discharge cycle characteristics is low ion conductivity of a solid electrolyte. The inventors have further found that the above object can be achieved by using a cathode active material, an anode active material, and a solid electrolyte shown respectively by the later-described formulas (1) to (3). This finding has led to the completion of the present invention.

SUMMARY OF THE INVENTION

Specifically, the present invention provides the following all-solid batteries.

[1] An all-solid-state battery having: a cathode comprising a cathode active material, an anode comprising an anode active material, and a solid electrolyte layer comprising a solid electrolyte, the cathode active material, the anode active material, and the solid electrolyte being compounds respectively shown by the following formulas (1), (2), and (3), $$M_aN^1_bX^1_c \quad (1)$$

$$M_dN^2_eX^2_f \quad (2)$$

$$M_gN^3_hX^3_i \quad (3)$$

wherein M is H, Li, Na, Mg, Al, K, or Ca; each of $X^1$, $X^2$, and $X^3$ is a polyanion; a, d, and g are numbers of 0 to 5; b, e, and h are numbers of 1 to 2; c, f, and i are numbers of 1 to 3; $N^1$ in the formula (1) is at least one atom selected from the group consisting of transition metals, Al, and Cu; $N^2$ in the formula (2) is at least one atom selected from the group consisting of transition metals, Al, and Cu; and $N^3$ in the formula (3) is at least one atom selected from the group consisting of Ti, Ge, Hf, Zr, Al, Cr, Ga, Fe, Sc, and In.

[2] The all-solid-state battery described in [1], wherein the polyanion is at least one selected from the group consisting of $SiO_4$, $PO_4$, $SO_4$, $MoO_4$, $WO_4$, $BO_4$, and $BO_3$.

[3] The all-solid-state battery described in [1] or [2], wherein $X^1$ and $X^2$ in the formulas (1) and (2) contain at least one identical polyanion selected from the above-mentioned polyanions and $X^2$ and $X^3$ in the formulas (2) and (3) contain at least one identical polyanion selected from the above-mentioned polyanions.

[4] The all-solid-state battery described in [1] to [3] above, wherein $X^1$, $X^2$, and $X^3$ in the formulas (1) to (3) are the same in all of the cathode active material, anode active material, and solid electrolyte.

[5] The all-solid-state battery described in [1] to [4] above, wherein M in the formulas (1) to (3) are the same in all of the cathode active material, anode active material, and solid electrolyte.

[6] The all-solid-state battery described in [1] to [5] above, wherein each of the cathode active material, anode active material, and solid electrolyte have a jointly-owned vertex skeleton structure in which $X^1$ in the formula (1), $X^2$ in the formula (2), and $X^3$ in the formula (3) are respectively jointly-owned vertexes.

[7] The all-solid-state battery described in [1] to [6] above, wherein the cathode active material, anode active material, and solid electrolyte are cationic conductors having a NASICON structure.

[8] The all-solid-state battery described in [1] to [7] above, wherein the solid electrolyte is included in the cathode and/or the anode.

[9] The all-solid-state battery described in [1] to [8], wherein $N^1$ and $N^2$ in the formulas (1) and (2) are the same in both the cathode material and the anode material.

The all-solid-state battery of the present invention has a high output power and a long life, is highly safe, and can be produced at a low cost.

DETAILED DESCRIPTION OF THE INVENTION AND PREFERRED EMBODIMENT

Preferred embodiments of the invention will be described below. Note that the invention is not limited to the following embodiments. Various modifications and improvements may be made in the embodiments within the scope of the invention based on knowledge of a person skilled in the art.

Figure 1:
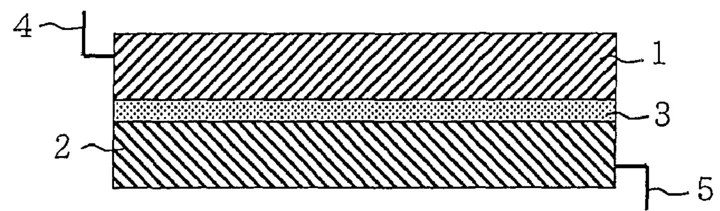
FIG. 1 is a partial schematic diagram showing one embodiment of an all-solid-state battery according to the present invention.

FIG. 1 is a partial schematic diagram showing one embodiment of the all-solid cell according to the present invention. As shown in FIG. 1, the all-solid cell of this embodiment is provided with a cathode 1, an anode 2, and a solid electrolyte layer 3 disposed between the cathode 1 and anode 2. A cathode collector 4 is electrically connected to the cathode 1. An anode collector 5 is electrically connected to the cathode 2.

Cathode 1 is an area containing a cathode active material and has a form of a thin film with a thickness preferably of 5 to 500 micrometer, and still more preferably 20 to 100 micrometer. The cathode active material contained in the cathode 1 is a compound shown by the following formula (1).

$$M_aN^1_bX^1_c \quad (1)$$

In the formula (1), M represents H, Li, Na, Mg, Al, K, or Ca. M is particularly preferably Li, Na, or Mg, $X^1$ in the formula (1) is a polyanion For example, the polyanion may be at least one selected from the group consisting of $SiO_4$, $PO_4$, $SO_4$, $MoO_4$, $WO_4$, $BO_4$, and $BO_3$. A particularly preferable $X^1$ is $PO_4$ or $MoO_4$. In the formula (1), a=0 to 5, b=1 to 2, and c=1 to 3.

In addition, $N^1$ in the formula (1) is at least one metal selected from the group consisting of transition metals, Al, and Cu. $N^1$ is particularly preferably Fe, Co, V, or Cu. As more specific examples of preferable cathode active material, $LiFePO_4$, $LiCoPO_4$, $Li_3V_2(PO_4)_3$, $LiCuPO_4$, and the like can be mentioned Anode 2 is an area containing an anode active material and has a form of a thin film with a thickness preferably of 5 to 500 micrometer, and still more preferably 20 to 100 micrometer. The anode active material contained in the anode 2 is a compound shown by the following formula (2), $$M_dN^2_eX^2_f \quad (2)$$

In the formula (2), M represents H, Li, Na, Mg, Al, K, or Ca. M is particularly preferably Li, Na, or Mg. $X^2$ in the formula (2) is a polyanion. For example, the polyanion may be at least one selected from the group consisting of $SiO_4$, $PO_4$, $SO_4$, $MoO_4$, $WO_4$, $BO_4$, and $BO_3$. A particularly preferable $X^2$ is $PO_4$ or $MoO_4$. In the formula (2), d=0 to 5, e=1 to 2, and f=1 to 3.

In addition, $N^2$ in the formula (2) is at least one metal selected from the group consisting of transition metals, Al, and Cu. $N^2$ is particularly preferably Co, Cu, or V.

As more specific examples of preferable cathode active material, $LiCoPO_4$, $LiCuPO_4$, $Li_3V_2(PO_4)_3$, and the like can be mentioned.

The solid electrolyte layer 3 is an area containing a solid electrolyte. The solid electrolyte layer 3 is formed in the form of a layer (a thin film) and disposed to separate the cathode 1 from anode 2. The thickness of the solid electrolyte layer 3 is preferably 5 to 500 micrometer, and still more preferably 20 to 100 micrometer.

The solid electrolyte contained in the solid electrolyte layer 3 of the all-solid-state battery of this embodiment is a compound shown by the following formula (3).

$$M_gN^3_hX^3_i \quad (3)$$

In the formula (3), M represents H, Li, Na, Mg, Al, K, or Ca. M is particularly preferably Li, Na, or Mg. $X^3$ in the formula (3) is a polyanion. For example, the polyanion may be at least one selected from the group consisting of $SiO_4$, $PO_4$, $SO_4$, $MoO_4$, $WO_4$, $BO_4$, and $BO_3$. A particularly preferable $X^3$ is $PO_4$ or $MoO_4$.

In the formula (3), $N^3$ is at least one atom selected from the group consisting of Ti, Ge, Hf, Zr, Al, Cr, Ga, Fe, Sc, and In. $N^3$ is particularly preferably Ti, Ge, or Al.

As the more specific examples of preferable solid electrolyte, cation conductors having a NASICON (Na Super Ionic Conductor) structure such as $LiTi(PO_4)_3$, $Li_{1.3}Al_{0.3}Ti_{1.7}(PO_4)_3$, $Li_{1.5}Al_{0.5}Ge_{1.5}(PO_4)_3$, and the like can be given.

In the all-solid-state battery of this embodiment, $X^1$ and $X^2$ in the formulas (1) and (2) contain at least one identical polyanion selected from the above-mentioned polyanions and the $X^2$ and $X^3$ in the formulas (2) and (3) contain at least one identical polyanion selected from the above-mentioned polyanions. When this requirement is satisfied, a battery with a higher output and a longer life can be obtained. This is thought to be the results of improvement of the battery's performance of delivering a large current and improvement of charge-and-discharge cycle characteristics due to improved ion conductivity among the cathode 1, anode 2, and solid electrolyte layer 3.

In the all-solid-state battery of this embodiment, $X^1$, $X^2$, and $X^3$ in the formulas (1) to (3) are preferably the same in all of the cathode active material, anode active material, and solid electrolyte. A battery having a higher output and a longer life can be obtained by using the same element group (X) functioning as a polyanion for all of the cathode active material, anode active material, and solid electrolyte in this manner. This is thought to be the results of promoted ion conductivity among the cathode 1, anode 2, and solid electrolyte layer 3 as a result of using the same $X^1$, $X^2$, and $X^3$ in the formulas (1) to (3) in all of the cathode active material, anode active material, and solid electrolyte. In order to obtain a battery having a higher output, excelling in charge-and-discharge cycle characteristics, and having a long life, it is preferable that each of the cathode active material, anode active material, and solid electrolyte in the all-solid-state battery in this embodiment has a jointly-owned vertex skeleton structure in which $X^1$ in the formula (1), $X^2$ in the formula (2), and $X^3$ in the formula (3) are respectively jointly-owned vertexes.

In the all-solid-state battery in this embodiment, M in the formulas (1) to (3) may be either the same element or different elements in each of the compounds represented by the formulas (1) to (3), provided that M in the formulas (1) to (3) is preferably the same element in all of the cathode active material, anode active material, and solid electrolyte. A battery having a higher output and a longer life can be obtained by using a specific element (M) for all of the cathode active material, anode active material, and solid electrolyte in this manner. This is thought to be the results of promoted ion conductivity among the cathode 1, anode 2, and solid electrolyte layer 3 as a result of using the same M in the formulas (1) to (3) in all of the cathode active material, anode active material, and solid electrolyte. Furthermore, it is preferable that all of the cathode active material, anode active material, and solid electrolyte are cationic conductors having a NASICON structure.

In the all-solid-state battery of this embodiment, it is preferable that $N^1$ and $N^2$ in the formulas (1) and (2) are the same in both the cathode material and the anode material because the preservation for a longer period of time becomes possible. It is further preferable that the cathode material and the anode material are substances shown by the same composition formula. It is general that, in a liquid type secondary battery on the market, a program for compulsory stopping charge/discharge thereafter when the potential gets out of a predetermined voltage range is incorporated into a protective circuit to secure safety. Such a battery has a problem that deterioration of an electrolytic solution is prone to make progress at an early stage and to cause self-discharge when the secondary battery is shipped and stored in a fully charged state. On the other hand, when the secondary battery is shipped and stored in a discharged state, it has a problem that voltage is lowered due to self-discharge, and thereby the above protective circuit operates. Therefore, in order to solve the above problems, it is general to ship and store the secondary battery in a half-discharged state to be around the intermediate potential within a predetermined voltage range.

Accordingly, by making $N^1$ and $N^2$ in the formulas (1) and (2) the same in both the cathode material and the anode material, it can be shipped and stored in a discharged state (voltage=0V). Therefore, the electrolytic solution is hardly deteriorated during storage, and self-discharge is suppressed, and thereby storage for a longer period of time can be possible. Further, by making $N^1$ and $N^2$ in the formulas (1) and (2) the same in both the cathode material and the anode material, a volume change rate of both the electrodes upon discharge and upon charge synchronizes. Therefore, since there is little volume change in the whole battery, a trouble such as a crack in an electrode or a solid electrolyte is hardly caused, and it has the advantage of hardly having battery deterioration.

Moreover, because all components in the all-solid-state battery of this embodiment are ceramic materials which are solid, the battery possesses high safety and is free from problems such as leakage of liquid, deterioration of battery performance due to corrosion, and the like. Furthermore, since all the components are made of ceramic materials, the all-solid-state battery can be manufactured at a low cost using a simple process.

Figure 2:
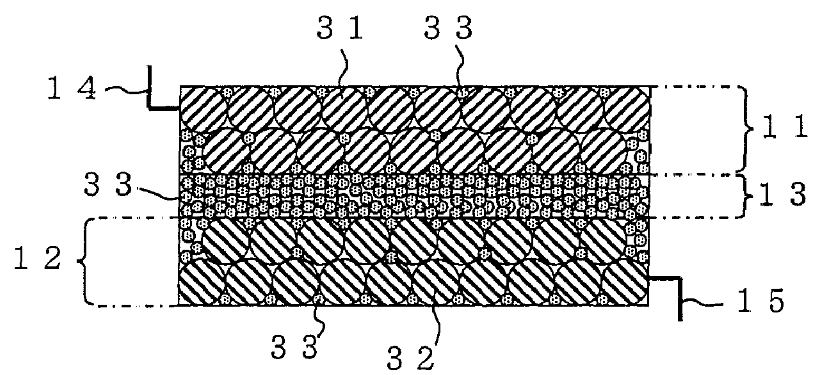
FIG. 2 is a partial schematic diagram showing another embodiment of an all-solid-state battery according to the present invention.

FIG. 2 is a partial schematic diagram showing another embodiment of the all-solid cell according to the present invention. In FIG. 2, a cathode 11 is an aggregate of a number of particles of a cathode active material 31. A cathode collector 14 is electrically connected to the cathode 11. An anode 12 is an aggregate of a number of particles of a cathode active material 32. An anode collector 15 is electrically connected to the anode 12. In addition, a solid electrolyte layer 13 is an aggregate of a number of particles of a solid electrolyte 33.

In the all-solid-state battery of this embodiment, the solid electrolyte 33 is included in the cathode 11 and anode 12. When this requirement of inclusion of the solid electrolyte 33 in the cathode 11 and anode 12 is satisfied, a battery with a higher output and a longer life can be obtained. This is thought to be the results of improved ion conductivity among the cathode 11, anode 12, and solid electrolyte layer 13. More specifically, it is desirable that a great number of particles of the solid electrolyte 33 be included in each electrode in a three-dimensionally connected state in boundaries of particles of the active materials (cathode active material 31 and anode active material 32) forming each electrode.

Although the solid electrolyte 33 may be included either one of the cathode 11 or anode 12, inclusion of the solid electrolyte 33 in both the cathode 11 and anode 12 is preferable in order to obtain a battery with a higher output and a longer life.

Figure 3:
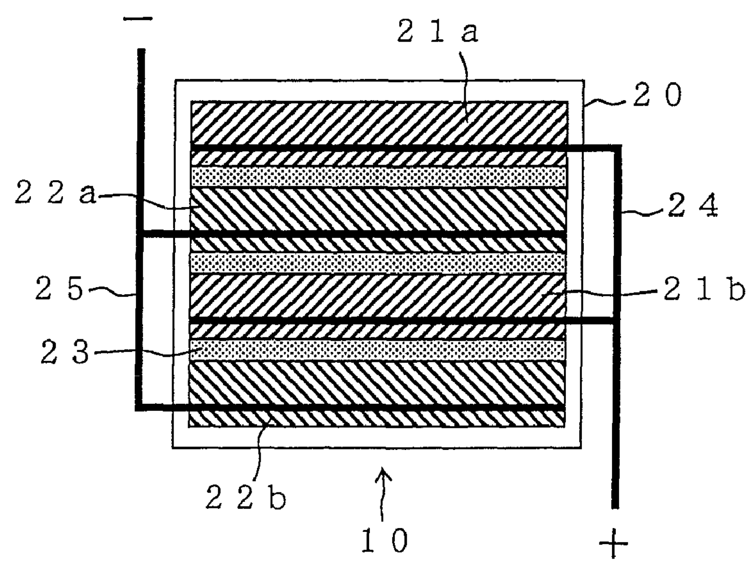
FIG. 3 is a partial schematic diagram showing still another embodiment of an all-solid-state battery according to the present invention.

FIG. 3 is a partial schematic diagram showing still another embodiment of the all-solid cell according to the present invention. The all-solid-state battery 10 of the embodiment shown in FIG. 3 comprises two or more cathodes 21*a* and 21*b* and two or more anodes 22*a* and 22*b*, which are laminated to form a laminate with a layer of solid electrolyte layer 23 intervening between the layers. A cathode collector 24 is electrically connected to the cathodes 21*a* and 21*b*. An anode collector 25 is electrically connected to the anodes 22*a* and 22*b*. In this manner, the all-solid-state battery may have a laminated structure comprising two or more cathodes 21*a* and 21*b* and two or more anodes 22*a* and 22*b*. A numeral 20 in FIG. 3 indicates a casing that can house al least cathodes 21*a* and 21*b*, anodes 22*a* and 22*b*, and a solid electrolyte layer 23.

Next, a method for manufacturing the all-solid-state battery of the present invention will be described by way of examples. A molding method such as a press method, doctor-blade method, and roll-coater method can be used for producing the cathode 1 (refer to FIG. 1). In the press method, a molded product can be obtained by filling a die or the like with a powder of the cathode active material and pressing the die. In the doctor-blade method and roll-coater method, a cathode active material is first mixed with a binder such as polyvinyl alcohol to obtain a composition. An appropriate amount of a solid electrolyte may be optionally added to the composition. Next, an organic solvent such as toluene is added to the resulting composition to prepare a cathode slurry. The cathode slurry thus obtained is formed into a thin film or a sheet by a molding method such as a doctor-blade method or roll-coater method. After drying, the thin film or sheet is appropriately processed by cutting or the like, as required, and baked to obtain a cathode 1. The anode 2 and solid electrolyte layer 3 can also be produced in the same manner as the cathode 1.

The cathode 1, anode 2, and solid electrolyte layer 3 thus obtained are laminated and then a cathode collector 4 and an anode collector 5 are provided. As the material for forming the cathode collector 4 and anode collector 5, platinum (Pt), platinum (Pt)/palladium (Pd), gold (Au), silver (Ag), aluminum (Al), copper (Cu), ITO (indium-tin oxide film), and the like can be given.

The cathode collector 4 and anode collector 5 can be disposed on the cathode 1 and anode 2 by a sputtering method, a resistance-heating vapor deposition method in which the material to be vapor-deposited is heated by resistance, an ion beam deposition method in which the material to be vapor-deposited is heated by ion beams, an electron beam evaporation method in which the material to be vapor-deposited is heated by electron beams, and the like. The components thus obtained are located in a casing or the like while maintaining insulation of cathode collector 4 and anode collector 5, thereby obtaining the all-solid-state battery of this embodiment.

Although the method for producing the all-solid-state battery was explained for the case of separately preparing the cathode 1, anode 2, and solid electrolyte layer 3 and laminating them, other method of preparation and lamination may be used. For example, it is possible to sequentially laminate the solid electrolyte layer 3 and anode 2 on the cathode 1 The layers may be separately baked by turn or all the layers may be baked at one time.

EXAMPLES

The present invention is described below in detail based on examples. However, the present invention is not limited to the following examples.

Example 1

A circular plate with a diameter of about 20 mm was formed by molding a powder of $Li_{1.3}Al_{0.3}Ti_{1.7}(PO_4)_3$ (a solid electrolyte) by molding die pressing. A powder of $LiFePO_4$ (a cathode active material) and a powder of $LiCoPO_4$ (an anode active material) were respectively laminated on the opposing sides of the circular plate by pressing, thereby obtaining a laminate. The resulting laminate was baked at 800° C. in an argon atmosphere to obtain a baked laminate. Gold (Au) was spattered onto the both sides of the baked laminate to form a collector layer. The baked laminate on which the collector layer was formed was incorporated into a CR2032-type coin battery in a glove box in an inert atmosphere to obtain an all-solid-state battery (Example 1), The average thicknesses (micrometer) of each of the cathode, anode, and solid electrolyte layer measured by cross-section SEM observation were respectively 50 micrometer, 50 micrometer, and 500 micrometer.

Examples 2 to 4, and 6 and Comparative Example 1

All-solid-state batteries (Examples 2 to 4, and 6 and Comparative Example 1) were prepared in the same manner as in Example 1, except for using the solid electrolytes, cathode active materials, and anode active materials shown in Table 1. The results of measurement of the thicknesses of the cathodes, anodes, and solid electrolyte layers are shown in Table 1.

Example 5

A circular plate with a diameter of about 20 mm was formed by molding a powder of $Li_{1.5}Al_{0.5}Ge_{1.5}(PO_4)_3$ (a solid electrolyte) by molding die pressing. A powder mixture of a cathode active material and a solid electrolyte mixture and a powder mixture of an anode active material and a solid electrolyte mixture were obtained by mixing a powder of $LiFePO_4$ (a cathode active material) and a powder of $LiCoPO_4$ (an anode active material) respectively with the powder of $Li_{1.5}Al_{0.5}Ge_{1.5}(PO_4)_3$ (a solid electrolyte) using a mortar. The procedure of Example 1 was followed after this to obtain an all-solid-state battery (Example 5). The results of measurement of the thicknesses of the cathode, anode, and solid electrolyte layer are shown in Table 1. The amount of the solid electrolyte contained in the electrodes (total of the cathode and anode) was 50 mass %.

[Cycle test]: A battery was charged with electricity at 10 microampere under constant current and constant voltage to a prescribed voltage, allowed to stand for 10 minutes with a current being shutoff, and discharged to a prescribed cut-off voltage at 10 microampere. This cycle test can be carried out using a single battery or two or more batteries in combination. This one cycle charge-and-discharge operation was repeated 100 cycles to determine the ratio of the discharge capacity after 100 cycles to the initial discharge capacity as a capacitance maintenance rater (%). The results are shown in Table 1.

[Internal resistance of battery]: A battery was charged with electricity at 10 microampere under constant current and constant voltage to a prescribed voltage, allowed to stand for 10 minutes with a current being shutoff, and discharged at 10 microampere. Internal resistance of battery (kΩ) was calculated from the voltage drop value after one second discharge at 10 microampere. The results are shown in Table 1.

TABLE 1

| | Cathode material | | Anode material | | Solid electrolyte | |
|---|---|---|---|---|---|---|
| | Composition | Structure | Composition | Structure | Composition | Structure |
| Example 1 | $LiFePO_4$ | OLIVINE | $LiCoPO_4$ | OLIVINE | $Li_{1.3}Al_{0.3}Ti_{1.7}(PO_4)_3$ | NASICON |
| Example 2 | $LiCoPO_4$ | OLIVINE | $LiCoPO_4$ | OLIVINE | $Li_{1.5}Al_{0.5}Ge_{1.5(PO4)3}$ | NASICON |
| Example 3 | $Li_3V_2(PO_4)_3$ | NASICON | $Li_3V_2(PO_4)_3$ | NASICON | $Li_{1.5}Al_{0.5}Ge_{1.5}(PO_4)_3$ | NASICON |
| Example 4 | $Li_3V_2(PO_4)_3$ | NASICON | $Li_3V_2(PO_4)_3$ | NASICON | $Li_{1.5}Al_{0.5}Ge_{1.5}(PO_4)_3$ | NASICON |
| Example 5 | $Li_3V_2(PO_4)_3$ | NASICON | $Li_3V_2(PO_4)_3$ | NASICON | $Li_{1.5}Al_{0.5}Ge_{1.5}(PO_4)_3$ | NASICON |
| Example 6 | $Li_2Fe_2(SO_4)_3$ | NASICON | $Al_2(MoO_4)_3$ | NASICON | $Li_{1.5}Al_{0.5}Ge_{1.5}(PO_4)_3$ | NASICON |
| Comparative Example 1 | $LiMn_2O_4$ | SPINEL | Carbon | Layered | $Li_{1.3}Al_{0.3}Ti_{1.7}(PO_4)_3$ | NASICON |

| | Solid electrolyte content of electrode (mass %) | Thickness of each layer (micrometer) Cathode | Anode | Solid electrolyte layer | Capacitance maintenance rate (%) | Internal resistance of battery (kΩ) |
|---|---|---|---|---|---|---|
| Example 1 | 0 | 50 | 50 | 500 | 80 | 60 |
| Example 2 | 0 | 40 | 60 | 500 | 81 | 54 |
| Example 3 | 0 | 60 | 50 | 500 | 85 | 30 |
| Example 4 | 0 | 50 | 50 | 100 | 88 | 22 |
| Example 5 | 50 | 60 | 40 | 100 | 95 | 11 |
| Example 6 | 0 | 50 | 50 | 100 | 90 | 20 |
| Comparative Example 1 | 0 | 40 | 60 | 500 | 70 | 120 |

(Discussion)

The all-solid-state batteries of Examples 1 to 6 clearly excel in capacitance maintenance rater and exhibit small internal resistance as compared with the all-solid-state battery of Comparative Example 1.

The all-solid-state battery of the present invention is suitable as a battery for portable instruments, a built-in battery for chip-cards, a battery for in-plant medical devices, a battery for a substrate-surface package, a battery used in combination with other batteries such as a solar battery (cells for hybrid power supplies), and the like

What is claimed is:

1. An all-solid-state battery having:

a cathode comprising a cathode material, an anode comprising an anode material, and a solid electrolyte layer comprising a solid electrolyte, wherein the cathode material, the anode material, and the solid electrolyte are a compound shown by the following formulas (1), (2), and (3), respectively, $$M_aN^1{}_bX^1{}_c \quad (1)$$

$$M_dN^2{}_eX^2{}_f \quad (2)$$

$$M_gN^3{}_hX^3{}_i \quad (3)$$

wherein M is H, Li, Na, Mg, Al, K, or Ca; each of $X^1$, $X^2$, and $X^3$ is a polyanion; a, d, and g are numbers of 0 to 5; b, e, and h are numbers of 1 to 2; c, f, and i are numbers of 1 to 3; $N^1$ in the formula (1) is at least one atom selected from the group consisting of transition metals, Al, and Cu; $N^2$ in the formula (2) is at least one atom selected from the group consisting of transition metals, Al, and Cu; and $N^3$ in the formula (3) is at least one atom selected from the group consisting of Ti, Ge, Hf, Zr, Al, Cr, Ga, Fe, Sc, and In.

2. The all-solid-state battery according to claim 1, wherein the polyanion is at least one selected from the group consisting of $SiO_4$, $PO_4$, $SO_4$, $MoO_4$, $WO_4$, $BO_4$, and $BO_3$.

3. The all-solid-state battery according to claim 1, wherein $X^1$ and $X^2$ in the formulas (1) and (2) contain at least one identical polyanion and $X^2$ and $X^3$ in the formulas (2) and (3) contain at least one identical polyanion.

4. The all-solid-state battery according to claim 1, wherein $X^1$, $X^2$, and $X^3$ in the formulas (1) to (3) are the same in all of the cathode material, the anode material, and the solid electrolyte.

5. The all-solid-state battery according to claim 1, wherein M in the formulas (1) to (3) are the same in all of the cathode material, the anode material, and the solid electrolyte.

6. The all-solid-state battery according to claim 1, wherein each of the cathode material, anode material, and solid electrolyte have a jointly-owned vertex skeleton structure in which $X^1$ in the formula (1), $X^2$ in the formula (2), and $X^3$ in the formula (3) are respectively jointly-owned vertexes.

7. The all-solid-state battery according to claim 1, wherein the cathode material, anode material, and solid electrolyte are cationic conductors having a NASICON structure.

8. The all-solid-state battery according to claim 1, wherein the solid electrolyte is included in at least one of the cathode and the anode.

9. The all-solid-state battery according to claim 1, wherein $N^1$ and $N^2$ in the formulas (1) and (2) are the same in both the cathode material and the anode material.

* * * * *